United States Patent [19]

Yoshikawa et al.

[11] Patent Number: 4,726,230
[45] Date of Patent: Feb. 23, 1988

[54] ULTRASOUND IMAGING APPARATUS

[75] Inventors: Noriaki Yoshikawa, Tochigi; Atsushi Nakai, Ootawara, both of Japan

[73] Assignee: Kabushiki Kaisha Toshiba, Kawasaki, Japan

[21] Appl. No.: 886,427

[22] Filed: Jul. 17, 1986

[30] Foreign Application Priority Data

Jul. 23, 1985 [JP] Japan .................................. 60-161177

[51] Int. Cl.⁴ ............................................ G01N 29/06
[52] U.S. Cl. ........................................ 73/607; 128/660
[58] Field of Search .................. 73/607, 606, 620, 626; 367/7, 138; 128/660

[56] References Cited

U.S. PATENT DOCUMENTS

3,919,683 11/1975 Itamura et al. ...................... 367/7 X
4,234,940 11/1980 Iinuma ................................ 73/626 X Primary Examiner—Jerry W. Myracle
Attorney, Agent, or Firm—Finnegan, Henderson, Farabow, Garrett & Dunner

[57] ABSTRACT

An ultrasound imaging apparatus transmits or receives an ultrasound beam by switching connections between ultrasound probes and a transmitting and receiving system. Channels of the transmitting and receiving system are respectively connected to first and second connectors through first and second N switching elements. Each of the first and second connectors has N connecting terminals. The terminals of the first and second connectors are respectively connected to 2N terminals of a third connector. The switching elements and the first to third connectors constitute a switching circuit. The switching elements in the switching circuit are selectively turned on/off according to a desired ultrasound transducer connected to a corresponding one of the first to third connectors, thereby causing the ultrasound transducer to transmit or receive the ultrasound beam.

8 Claims, 8 Drawing Figures

ULTRASOUND IMAGING APPARATUS

BACKGROUND OF THE INVENTION

The present invention relates to an ultrasound imaging apparatus which has different types of ultrasound transducers or probes, each with a large number of transducer elements arranged in a predetermined pattern, and which is used by selectively switching the transducers.

In a conventional ultrasound imaging apparatus employing linear electronic scanning, a large number of linearly aligned transducer elements are used and ultrasound transmitting and receiving timings of the ultrasound transducers are controlled to perform linear scanning. Among conventional linear electronic scanning type ultrasound imaging apparatuses, some medical diagnostic ultrasound imaging apparatuses are arranged in the following manner. A plurality of ultrasound probes, normally two probes, are simultaneously connected to each apparatus, and electrical connections to the ultrasound transducers are switched inside the apparatus by a switching circuit consisting of relays or semiconductor switches, thereby using one of the ultrasound transducers to transmit/receive ultrasound waves.

Figure 1:
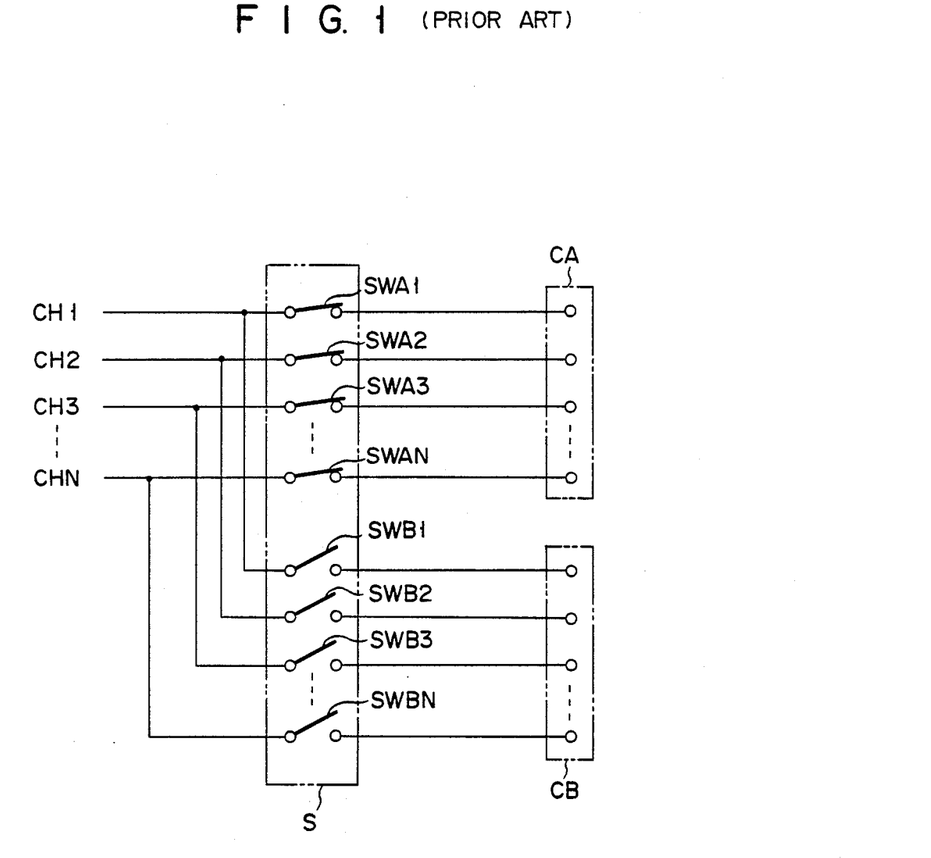
FIG. 1 is a circuit diagram of a switching circuit in a conventional ultrasound imaging apparatus.

An example of an ultrasound transducer switching circuit is illustrated in FIG. 1.

The switching circuit in FIG. 1 comprises switch section S consisting of switches SWA1 to SWAN and SWB1 to SWBN constituted by relays or semiconductor switches. One terminal of each of switches SWA1 to SWAN is connected to a corresponding one of channels CH1 to CHN for a transmitting and receiving system (including the transmitting and receiving circuits) in the apparatus. One terminal of each of switches SWB1 to SWBN is connected to corresponding one terminal of each of switches SWA1 to SWAN. The other terminal of each of switches SWA1 to SWAN is connected to N-channel first connector CA. The other terminal of each of switches SWB1 to SWBN is connected to N-channel second connector CB. Connectors CA and CB are respectively connected to first and second transducers (not shown in FIG. 1) each having a maximum of N transducer elements. Switch section S is controlled by a control circuit arranged in the apparatus to selectively connect the transmitting and receiving system channels CH1 to CHN to connector CA or CB. Upon operation of switch section S, one of the first and second ultrasound probes connected to connectors CA and CB is used to transmit or receive the ultrasound wave.

Switching control in the switching circuit of FIG. 1 can be achieved by selecting one set of switches SWA1 to SWAN and SWB1 to SWBN. For this reason, a maximum number of ultrasound elements in the first or second ultrasound transducer is equal to N, i.e., the number of channels. The width of the field of view and the quality of an ultrasound image produced by the conventional apparatus are limited by the maximum number of first or second ultrasound transducers.

SUMMARY OF THE INVENTION

It is an object of the present invention to provide an ultrasound imaging apparatus wherein an ultrasound transducer having a number of elements which is a maximum of twice that in a conventional apparatus can be connected without changing the number of switches in a switching circuit, thereby increasing the width of the field of view of an ultrasound image and improving image-quality.

In order to achieve the above object of the present invention, there is provided an ultrasound imaging apparatus comprising: first and second connectors each having N (where N is a positive integer) terminals, the first and second connectors adapted to respectively connect first and second ultrasound transducers each having not more than N transducer elements; a third connector having 2N terminals connected to the N terminals of the first and second connectors, the third connector being adapted to connect a third ultrasound transducer having not more than 2N transducer elements; an N-channel transmitting and receiving system having N-channel input/output signal lines, the N-channel transmitting and receiving system being adapted to generate a signal for driving the ultrasound elements of the first to third ultrasound transducers according to a predetermined scanning scheme, and to process signals detected by the transducer elements to obtain a display ultrasound image signal; a switching circuit, arranged between the N-channel transmitting and receiving system and the first to third connectors, for selectively connecting active ones of the signal lines of the N-channel transmitting and receiving system to the 2N terminals of the third connector; and a display for receiving an ultrasound image signal from the transmitting and receiving system and displaying an ultrasound image.

According to the ultrasound imaging apparatus of the present invention, in addition to the ultrasound transducer having not more than N transducer elements, the ultrasound transducer having not more than 2N transducer elements can be used to transmit/receive the ultrasound wave, thereby increasing the width of the field of view of an ultrasound image and improving its quality.

DETAILED DESCRIPTION OF THE PREFERRED EMBODIMENTS

Figure 2:
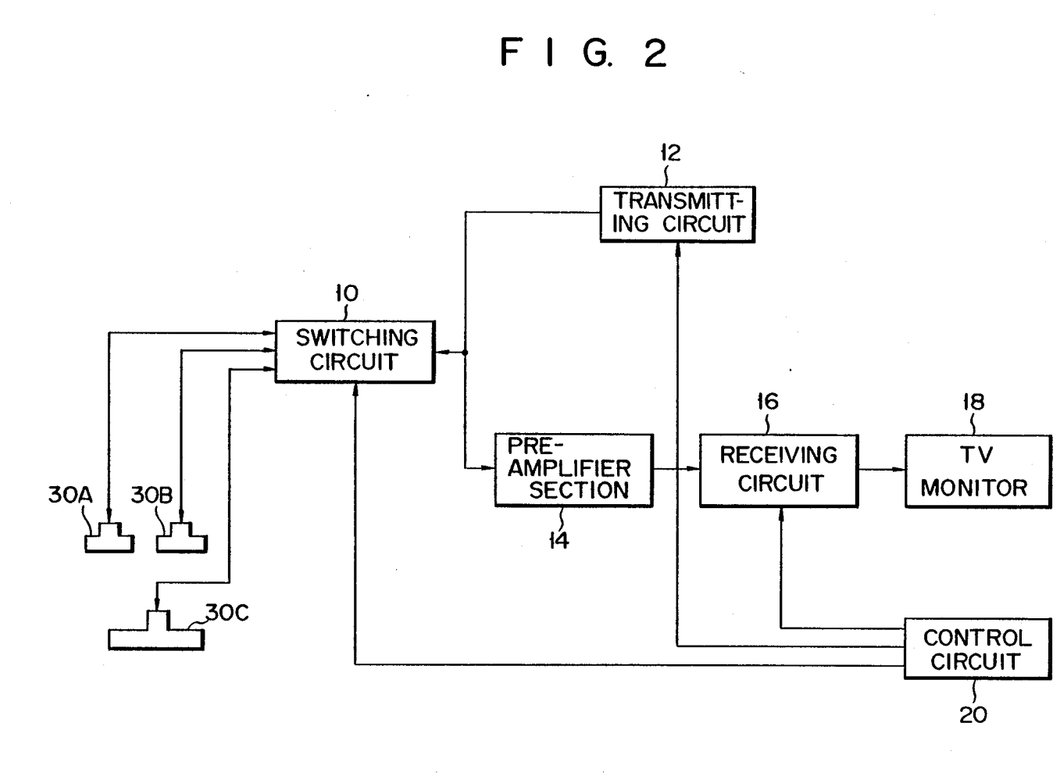
FIG. 2 is a block diagram showing a schematic arrangement of an ultrasound imaging apparatus according to a first embodiment of the present invention.

An ultrasound imaging apparatus according to a first embodiment in FIG. 2 includes switching circuit 10, transmitting circuit 12, preamplifier section 14, receiving circuit 16, TV (television) monitor 18, and control circuit 20. Switching circuit 10 can be connected to first and second ultrasound transducers 30A and 30B each having N transducer elements or less, and third ultrasound transducer 30C having 2N transducer elements or less.

Figure 3:
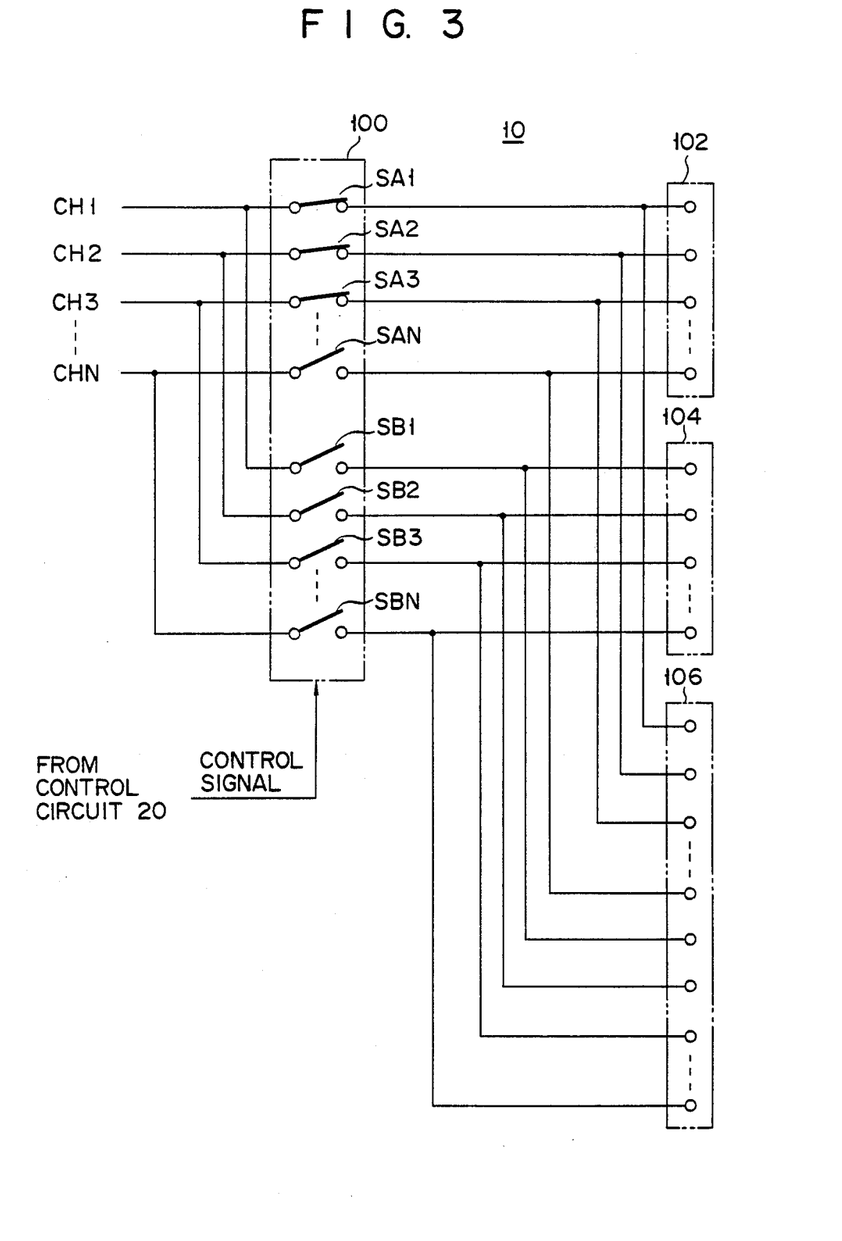
FIG. 3 is a circuit diagram showing a detailed arrangement of the ultrasound imaging apparatus of the first embodiment.

The detailed arrangement of switching circuit 10 is shown in FIG. 3. Circuit 10 includes switch section 100 consisting of first switches SA1 to SAN and second switches SB1 to SBN, first and second connectors 102 and 104 to be connected to transducers 30A and 30B, and third connector 106 to be connected to transducer 30C. Switches SA1 to SAN and SB1 to SBN in switch section 100 comprise relays or semiconductor switches, respectively, and ON/OFF operation of each switch is individually controlled in response to an electrical signal from control circuit 20. One terminal of each of switches SA1 to SAN is connected to a corresponding one of channels CH1 to CHN in the transmitting and receiving system. One terminal of each of switches SB1 to SBN is connected to corresponding one terminal of each of switches SA1 to SAN. The other terminal of each of switches SA1 to SAN is connected to connector 102. The other terminal of each of switches SB1 to SBN is connected to connector 104. The other terminal of each of switches SA1 to SAN and SB1 to SBN is also connected to third connector 106.

Transmitting circuit 12 generates drive pulses for driving transducer elements to emit an ultrasound beam from each transducer. More specifically, the drive pulses are supplied from transmitting circuit 12 to each ultrasound transducer through switching circuit 10. A signal received by the ultrasound transducer is supplied to preamplifier section 14 through switching circuit 10. Preamplifier section 14 amplifies an input signal, and an amplified signal is supplied to receiving circuit 16. Receiving circuit 16 performs predetermined processing of the amplified signal. The processed signal is supplied to TV monitor 18 to display an ultrasound image.

Transmitting and receiving circuits 12 and 16 are controlled and operated alternately by control circuit 20.

Figure 4:
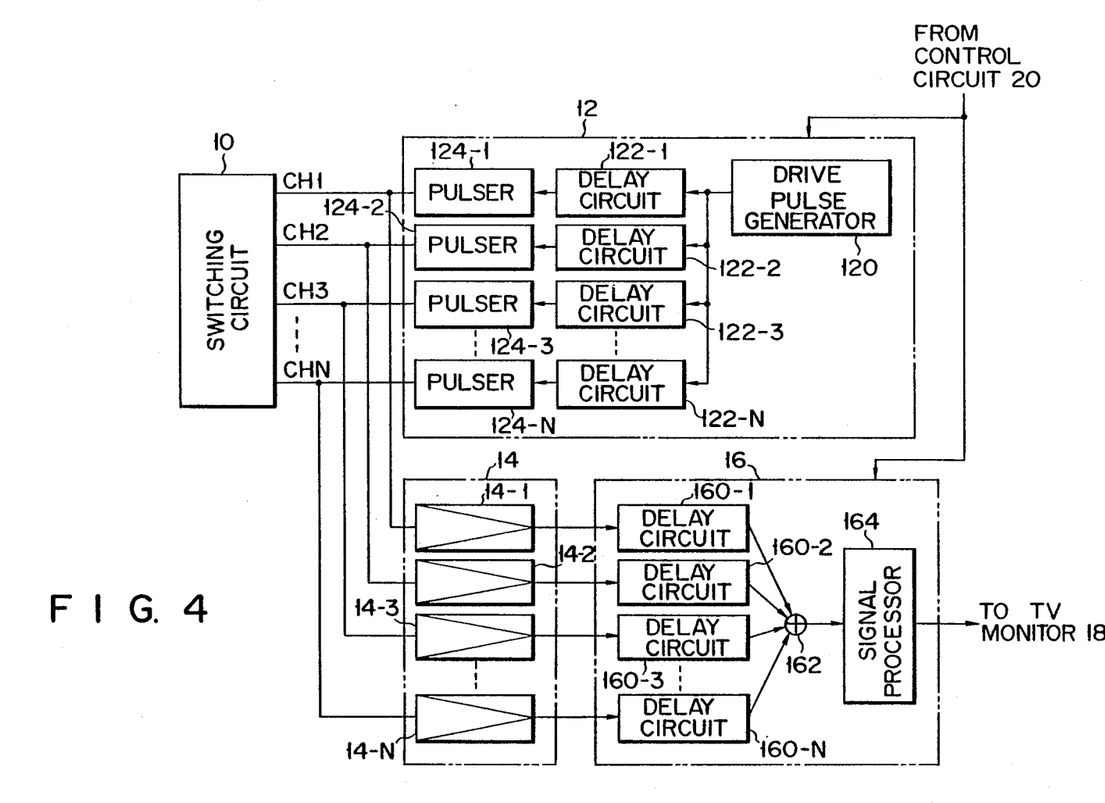
FIG. 4 is a block diagram showing a detailed arrangement of a transmitting and receiving system in the apparatus shown in FIG. 2.

The detailed arrangement of the transmitting and receiving system consisting of transmitting circuit 12, preamplifier section 14, and receiving circuit 16 is shown in FIG. 4.

Transmitting circuit 12 includes drive pulse generator 120, N delay circuits 122-1, 122-2, 122-3, ... 122-N, and N pulsers 124-1, 124-2, 124-3, ... 124-N. Drive pulses having a predetermined period from generator 120 in response to the control signal from control circuit 20 are respectively delayed by N delay circuits 122-1, 122-2, 122-3, ... 122-N. Pulsers 124-1, 124-2, 124-3, ... 124-N generate transducer element drive pulses in response to outputs from delay circuits 122-1, 122-2, 122-3, ... 122-N. Outputs from pulsers 124-1, 124-2, 124-3, ... 124-N are supplied as pulses for channels CH1, CH2, CH3, ... CHN to switching circuit 10 and are then supplied from circuit 10 to one of ultrasound transducers 30A to 30C. Ultrasound transmission beam deflection and/or ultrasound transmission beam focusing is performed according to a combination pattern of delay times of delay circuits 122-1 to 122-N. The delay times of circuits 122-1 to 122-N are designed to electrically change so that the combination pattern of the delay times of circuits 122-1 to 122-N can be controlled by control circuit 20 as needed.

Preamplifier section 14 includes N preamplifiers 14-1, 14-2, 14-3, ... 14-N. Preamplifiers 14-1 to 14-N respectively amplify signals of channels CH1, CH2, CH3, ... CHN supplied from one of transducers 30A to 30C through switching circuit 10. Receiving circuit 16 includes N delay circuits 160-1, 160-2, 160-3, ... 160-N, adder 162, and signal processor 164. Delay circuits 160-1, 160-2, 160-3, ... 160-N delay by predetermined delay times the pulses amplified by preamplifiers 14-1, 14-2, 14-3, ... 14-N. The pulses delayed by delay circuits 160-1 to 160-N as described above are added by adder 162. A sum signal from adder 162 is supplied to signal processor 164 and is subjected to predetermined processing for producing a signal to be displayed on TV monitor 18. The display signal is finally displayed on TV monitor 18. The received beam based on the sensitivity distribution of the received ultrasound wave is deflected or focused by delay circuits 160-1 to 160-N. Receiving circuit 16 is operated under the control of control circuit 20.

TV monitor 18 displays an ultrasound image according to an output from signal processor 164 in receiving circuit 16. Control circuit 20 supplies control signals to transmitting circuit 12, receiving circuit 16, and switching circuit 10.

The operation of the ultrasound imaging apparatus having the arrangement described above will be described hereinafter.

Ultrasound transmission/reception of first ultrasound transducer 30A having N transducer elements connected to first connector 102 will be first described.

In this case, transducer 30A must be connected to first connector 102, and transducer 30C must not be connected to third connector 106. However, second ultrasound transducer 30B may or may not be connected to second connector 104.

Switches SA1 to SAN are turned on and switches SB1 to SBN are turned off in response to the control signal from control circuit 20 to switching circuit 10. In this state, transmitting and receiving circuits 12 and 16 are operated in response to the control signal supplied from control circuit 20. In the same manner as in the conventional apparatus, ultrasound transmission and reception are performed by the N transducer elements of transducer 30A, and an ultrasound image is displayed on TV monitor 18. If ultrasound transmission/reception by sector scanning using first ultrasound transducer 30A is performed, all N transducer elements constituting transducer 30A, are driven for each drive pulse output from generator 120. An ultrasound beam transmitted or received for each drive pulse is deflected in a direction determined by the delay time pattern of delay circuits 122-1 to 122-N and/or 160-1 to 160-N. The beam deflection angle is sequentially changed by the drive pulses, thereby achieving sector scanning. However, if ultrasound transmission/reception by sector scanning using first ultrasound transducer 30A is performed, a predetermined number of elements, e.g., M elements out of N elements constituting transducer 30A are driven for each drive pulse from generator 120 in transmitting circuit 12. The position of the set of M elements is sequentially shifted pulse by pulse so that the ultrasound beam is translated along the alignment direction of the transducer elements, thus achieving linear scanning of transmission/reception ultrasound beam. In either sector or linear scanning, the ultrasound beam can be focused by determining a delay time pattern of delay circuits 122-1 to 122-N and/or 160-1 to 160-N corresponding to the transducer elements to be driven.

Ultrasound transmission/reception of second ultrasound transducer 30B having N elements and connected to second connector 104 is substantially the same as that of ultrasonic transducer 30A. In the case of transducer 30B, however, it must be connected to connector 104. Transducer 30C must not be connected to third connector 106. Transducer 30A may be connected to first connector 102. Switches SA1 to SAN are turned off and switches SB1 to SBN are turned on in response to the control signal from control circuit 20 to switching circuit 10. In this state, transmitting and receiving circuits 12 and 16 are operated in response to the control signal from control circuit 20 to effect ultrasound transmission/reception of transducer 30B having N elements. An ultrasound image is displayed on TV monitor 18.

Ultrasound transmission/reception of third ultrasound transducer 30C having 2N elements and connected to third connector 106 will be described.

In this case, first and second ultrasound transducers 30A and 30B must not be connected to first and second connectors 102 and 104. Only third ultrasound transducer 30C must be connected to third connector 106.

Transmitting and receiving circuits 12 and 16 are operated in response to the control signal from control circuit 20. The control signal is supplied from control circuit 20 to switching circuit 10 so that switches SA1 to SAN and SB1 to SBN are selectively turned on/off. The number of transducer elements to be driven by one drive pulse outputted from drive pulse generator 120 must fall within the range of N elements in transducer 30C. For this reason, only linear scanning is applied to transducer 30C. In normal linear scanning, succeeding M ($M \leq N$) elements out of 2N elements of transducer 30C are used for each drive pulse to perform ultrasonic transmission/reception. The position of M elements is sequentially shifted by one element. Therefore, among switches SA1 to SAN and SB1 to SBN, switches corresponding to the M elements used in each ultrasound transmission/reception cycle are selectively turned on.

The ultrasound beam can be transmitted or received by third ultrasound transducer 30C having 2N elements according to linear scanning. Therefore, since ultrasound transducer 30C, having an element number twice the maximum element number N of each transducer 30A or 30B of the conventional apparatus, can be used according to linear scanning, the scanning line density can be doubled if the width of the field of view of the resultant ultrasound image is kept unchanged, thereby reducing the grating lobes. In addition, if the scanning line density of transducer 30A or 30B for determining the quality of the ultrasound image is kept unchanged, the width of the field of view can be doubled.

The effective channels in the transmitting and receiving system and operation of switching circuit 10 in the use of third transducer 30C will be described in more detail. For the sake of simplicity, assume that the number of channels in the transmitting and receiving system is 16, the number M of transducer elements simultaneously driven in the transducer is 3, and the number of transducer elements is 32.

Figure 5:
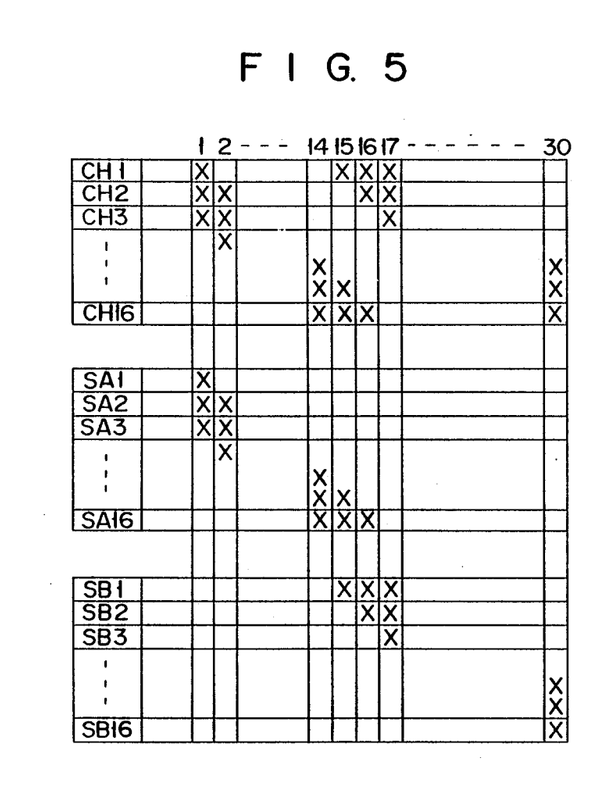
FIG. 5 is a table for explaining the operation of the apparatus shown in FIG. 2.

Referring to FIG. 5, at the first drive pulse generation timing, channels CH1 to CH3 are effective (represented by "X"), and switches SA1 to SA3 are turned on (represented by "X"). The ultrasound beam is transmitted and received by the first to third transducer elements out of 2N elements. At the next drive pulse generation timing, channels CH2 to CH4 are effective, and switches SA2 to SA4 are turned on. The ultrasound beam is transmitted and received by the second to fourth transducer elements. In the same manner as described, the effective channels and the ON switches are sequentially shifted for each pulse. At the 14th drive pulse generation timing, channels CH14 to CH16 are effective, and switching SA14 to SA16 are turned on. The ultrasound beam is transmitted and received by the 14th to 16th transducer elements. At the 15th drive pulse generation timing, channels CH15, CH16, and CH1 are effective, and switches SA15, SA16, and SB1 are turned on. The ultrasound beam is transmitted and received by the 15th to 17th transducer elements. At the 16th drive pulse generation timing, channels CH16, CH1, and CH2 are effective, and switches SA16, SB1, and SB2 are turned on. The ultrasound beam is transmitted and received by the 16th to 18th transducer elements. Finally, at the 30th drive pulse generation, channels CH14, CH15, and CH16 are effective, and switches SB14, SB15, and SB16 are turned on. The ultrasound beam is transmitted and received by the 30th to 32nd transducer elements. The above operation is repeated to complete linear scanning using transducer 30C having 2N, i.e., 32 transducer elements. The above operation exemplifies a case wherein switches SA1 to SA16 and SB1 to SB16 are selectively turned on in response to the effective channels in the transmitting and receiving system. However, if switches including the one corresponding to the used transducer element are turned on and two switches commonly connected to an effective one of channels CH1 to CH16 in the transmitting and receiving system are not simultaneously turned on, the control pattern is not limited to the exemplified one.

Figure 6A:
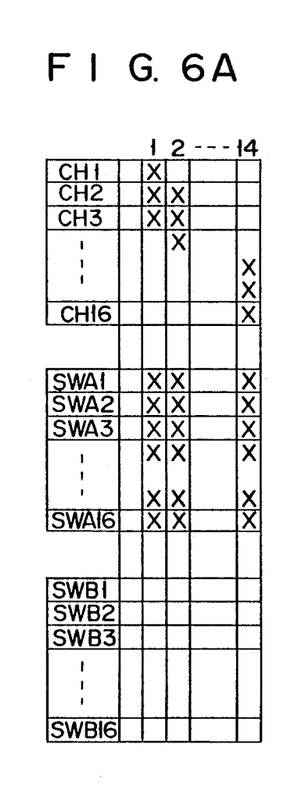
FIGS. 6A and 6B are tables for explaining the operation of the apparatus in FIG. 1.
Figure 6B:
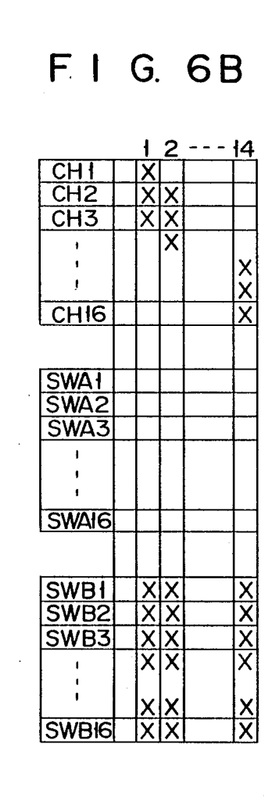

For the purpose of comparison, the operation of the conventional apparatus in FIG. 1 will be described in FIGS. 6A and 6B, using the same control scheme as in FIG. 5. FIG. 6A shows a case wherein a transducer having 16 elements connected to connector CA is used. All switches SWA1 to SWA16 connected thereto are turned on, and all switches SWB1 to SWB16 connected to the other transducer are turned off. FIG. 6B shows a case wherein a transducer having 16 elements connected to connector CB is used. All switches SWB1 to SWB16 connected thereto are turned on, and all switches SWA1 to SWA16 connected to the other transducer are turned off.

The present invention is not limited to the particular embodiment described above. Various changes and modifications may be made within the spirit and scope of the invention.

Figure 7:
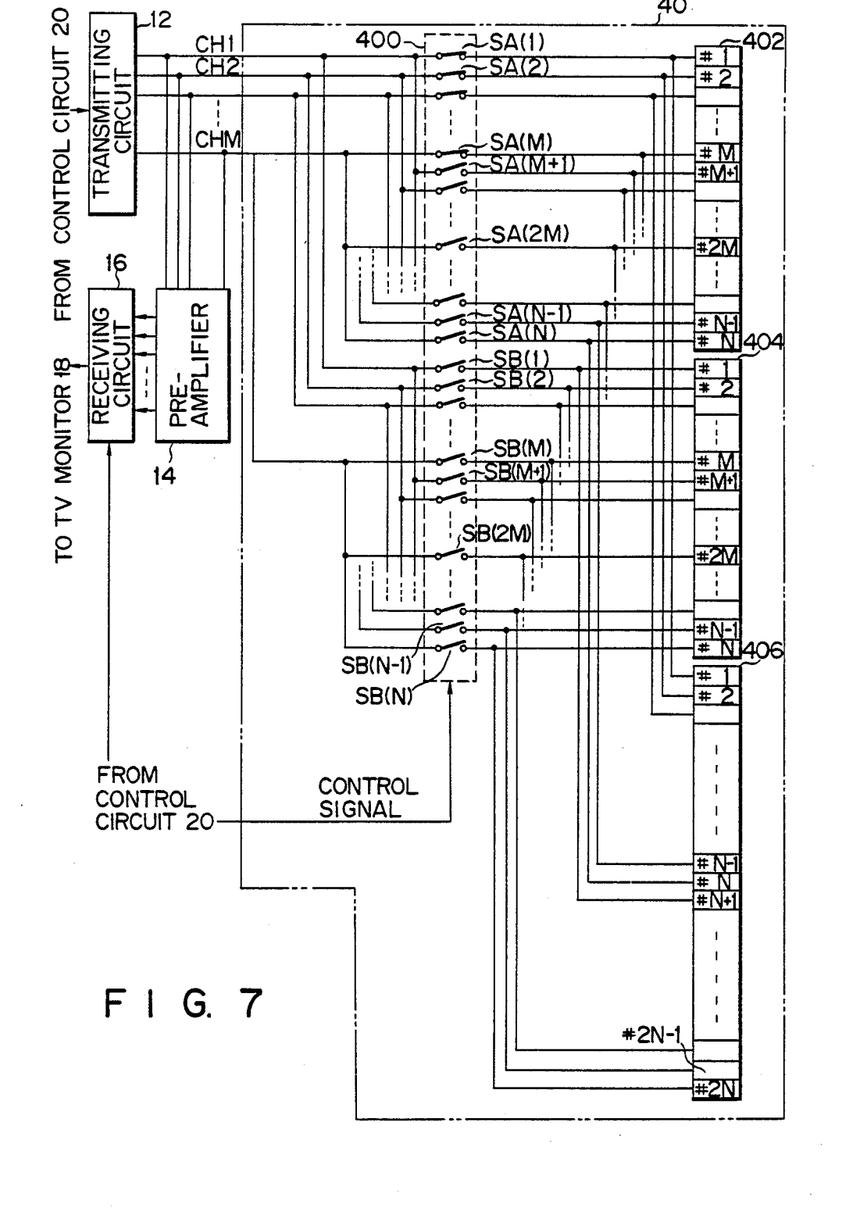
FIG. 7 is a block diagram showing part of an ultrasound imaging apparatus according to a second embodiment of the present invention.

A second embodiment of the present invention, a main part of which is illustrated in FIG. 7, exemplifies a system for performing only linear electronic scanning. In this case, a transmitting and receiving system, i.e., a combination of transmiting circuit 12, preamplifier section 14, and receiving circuit 16, is constituted by M-channel portion corresponding to the number of transducer elements driven in response to one drive pulse (one ultrasound beam constituting one scanning line is formed). Switching circuit 40 comprises switch section 400 and first, second, and third connectors 402, 404, and 406. Switch section 400 comprises switches SA(1), SA(2), ... SA(M), SA(M+1), ... SA(2M), ... SA(N−1), and SA(N), and switches SB(1), SB(2), ... SB(M), SB(M+1), ... SB(2M), ... SB(N−1), and SB(N). Each of first and second connectors 402 and 404 has N terminals #1, #2, ... #M, #M+1, ... #2M, #N−1, and #N. Third connector 406 has 2N terminals #1, #2, ... #N−1, #N+1, ... #2N−1, and #2N. The first terminals of switches SA(1) to SA(N) and SB(1) to SB(N) are commonly connected at (M−1) intervals and to channels CH1 to CHM in the transmission/reception system. The second terminals of switches SA(1) to SA(N) and SB(1) to SB(N) are respectively connected to terminals #1 to #N of connector 402 and terminals #1 to #N of connector 403, respectively. The second terminals of switches SA(1) to SA(N) and SB(1) to SB(N) are respectively connected to terminals #1 to #2N of third connector 406. Switches SA(1) to SA(N) and SB(1) to SB(N) are responsive to a control signal from control circuit 20. If a transducer connected to first or second connector 402 or 404 is used, M switches among switches SA1 to SAN or SB1 to SBN are selectively turned on, and the transmission/reception system is operated in response to the ON operation of the selected switches (switching operation in this case is the same as that described in, for example, U.S. Pat. No. 3,919,683). However, if a transducer connected to third connector 406 is used, of switches SA1 to SAN and corresponding M switches SB1 to SBN, M sequential switches are selectively turned on and the transmission/reception system is enabled while those M switches are turned on.

First and second connectors 102 and 104 or 402 and 404 are not limited to an application with sector or linear scanning, but can be connected to any type of transducer in the transmitting and receiving system. Any type of transducer for performing predetermined scanning within the limit of N transducer elements can be connected to third connector 106.

What is claimed is:

1. An ulatrasound imaging apparatus comprising:
   first and second ultrasound transducer means, each having not more than N (where N is a positive integer) transducer elements;
   third ultrasound transducer means, each having not more than 2N transducer elements;
   first and second connnecting means, each having N terminals, said terminnals of each respective connecting means being connected to corresponding transducer elements of each of said first and second tranducer means;
   third connecting means having 2N terminals, said terminals being connected to respective transducer elements of the third ultrasound transducer means;
   N-channel transmitting and receiving means having N-channel input/output signal lines for generating a signal to drive said ultrasound elements of said first, second, and third ultrasound transducer means in accordance with a predetermined scanning scheme, and for processing signals detected by said transducer elements of said first, second, and third transducer means to obtain a display image signal;
   switching means, disposed between said signal lines of said N-channel transmitting and receiving means and said first, second, and third connecting means, for selectively connecting a predetermined number of said signal lines of said N-channel transmitting and receiving means to said 2N terminals of said third connecting means; and
   a display responsive to ultrasound image signals from said transmitting and receiving means for displaying an ultrasound image.

2. An apparatus according to claim 1, wherein said switching means includes first N electronic switching elements and second N electronic switching elements, all of which are subjected to electrical conduction/nonconduction, one terminal of each of said first and second N electronic switching elements being connected to said N-channel signal lines of said transmitting and receiving means, and the other terminal of said first and second N electronic switching elements being connected to a corresponding one of said 2N terminals of said third connecting means which are respectively connected to said N terminals of said first and second connecting means.

3. An apparatus according to claim 2, wherein said switching elements are semiconductor switches.

4. An apparatus according to claim 2, wherein said switching elements are relays.

5. An apparatus according to claim 1, wherein said transmitting and receiving means includes an M-channel (where M is a positive integer smaller than N) transmitting and receiving circuit having M channel input/output signal lines, and a switching circuit selectively connected to said N channel signal lines in synchronism with transmitting and receiving scanning of the M channel signal lines of said transmitting and receiving circuit.

6. An apparatus according to claim 5, wherein said transmitting and receiving circuit comprises a circuit for driving a set of M transducer elements to perform linear scanning.

7. An apparatus according to claim 1, wherein said first, second and third ultrasound transducer means comprise linear electric scanning ultrasound transducers.

8. An apparatus according to claim 1, wherein said first and second transducer means are sector electronic scanning ultrasound transducers, and said third ultrasound transducer comprises a linear electronic scanning ultrasound transducer.

* * * * *